UNITED STATES PATENT OFFICE.

RUEL PHILBROOK, OF BOSTON, MASSACHUSETTS, ASSIGNEE OF ELLEN F. TOWERS, WIDOW OF WILLIAM H. TOWERS, DECEASED.

WATER-PROOF FABRIC.

SPECIFICATION forming part of Reissued Letters Patent No. 9,628, dated March 29, 1881.

Original No. 73,139, dated January 7, 1868. Application for reissue filed July 18, 1879.

*To all whom it may concern:*

Be it known that WILLIAM H. TOWERS, of Boston, in the county of Suffolk and State of Massachusetts, invented certain new and useful Improvements in Water-Proof Fabrics; and I, RUEL PHILBROOK, of said city of Boston, and the true and lawful assignee of the same, do hereby declare that the following is a full, clear, and exact description of the said invention and improvement.

The nature of the said invention consists in making an improved water-proof enameled fabric suitable for the manufacture of traveling-bags, trunks, valises, carriage-tops, table-covers, piano-covers, furniture-covers, and the like articles by combining one or more sheets of paper with one or more folds of any strong textile fabrics, such as muslin, sheeting, duck, linen, or parchment-paper, and finishing the surface of the paper with a coating of enamel, so as to resemble what is known as "patent-leather." From the nature of the materials in this fabric it is quite strong and durable, and in many respects equal to patent-leather, while it can be afforded at much less cost.

The following description will enable others to make and use the said invention.

For preparing a fabric suitable for making traveling-bags, take strong buff paper and cement it to cotton cloth, muslin, hempen cloth, or coarse linen with paste, cement, or size. A water-proof cement will make the article more durable, but is not necessary, since the enamel applied to the paper will render the whole water-proof. This fabric of paper, or paper and cloth, is then coated on the paper side with the enamel well known in the manufacture of patent-leather or any equivalent coating, (upon the paper,) which will produce a similar effect. The materials for, and the process of, applying enamel to leather, being well known, need not be particularly described.

To render the process more flexible the paper used may be impregnated with glycerine. Any strong paper may be used instead of buff paper, and one or more thicknesses may be employed, according as a thinner or thicker fabric is required.

Instead of using cotton cloth, linen, duck, or sheeting, any other equivalent fabric may be used.

Manila paper such as is now used for the manufacture of paper belting may be substituted for the woven fabric. This paper may also be first converted into what is known as "vegetable parchment."

By this process a fabric is produced identical in outward appearance with patent-leather, and a good substitute for that article in many manufactures. The enamel combines thoroughly with the paper. This fabric may be ornamented by painting, stamping, printing, or gilding.

By pasting a sheet of paper on both sides of muslin or other woven fabric, a fabric enameled on one or both sides may be produced.

The fabric above described may be made to resemble leather still more by saturating the fibrous materials of which it is composed with glue or gelatine and then treating it with tannin or tannic acid, so as to convert the whole into an artificial leather.

Waterproofing materials, such as resins, gums, collodion, drying-oils, wax, paraffine, and the like may be combined with the fabric, either by adding them to the cement which unites the several sheets making up the compound fabric or by treating the sheets before combining, or by saturating the fabric after it is formed. Glycerine will serve to remove and to prevent harshness and brittleness in the fabric, and gives the necessary softness and pliability.

By combining white lead, oxide of zinc, oxide of iron, or other oxides and pigments with the cement a greater body may be given to the fabrics.

Having thus described the said invention, what I claim, and desire to secure by Letters Patent of the United States, is—

1. The improved fabric made substantially as herein described.

2. The combination of one or more thicknesses of paper with a woven fabric, and finishing the same with enamel, substantially as herein described.

3. The manufacture of traveling-bags, trunks, valises, table-covers, carriage-tops, and similar articles by combining paper, previous to being enameled, with other textile fabric, substantially as described.

4. The application of glycerine to compound fabrics of paper, or of paper and cloth, such as herein described, to render them tough and pliable, substantially as set forth.

5. The combination of gums, resins, paraffine, collodion, drying-oils, and the like with a fabric composed of paper, or paper and cloth, substantially as described.

In testimony whereof I have, on this 14th day of July, A. D. 1879, hereunto set my hand in the presence of—

RUEL PHILBROOK.

Witnesses:

QUINCY PIERCE,
CHARLES C. CONANT.